United States Patent [19]

Chin et al.

[11] Patent Number: 5,204,927
[45] Date of Patent: Apr. 20, 1993

[54] METHOD AND APPARATUS FOR MAKING A FIBER OPTICAL COUPLER

[75] Inventors: Aland K. Chin, Sharon; Jeffrey E. Bisberg, Needham, both of Mass.

[73] Assignee: Polaroid Corporation, Cambridge, Mass.

[21] Appl. No.: 844,216

[22] Filed: Mar. 2, 1992

[51] Int. Cl.$^5$ .............................................. G02B 6/04
[52] U.S. Cl. .................................. 385/121; 385/115; 385/15; 359/900; 242/178
[58] Field of Search .................. 385/15, 115–121, 385/147; 359/900; 29/745, 747, 868; 242/178

[56] References Cited

U.S. PATENT DOCUMENTS

| | | | |
|---|---|---|---|
| 3,033,731 | 5/1962 | Cole | 385/116 |
| 3,125,812 | 3/1964 | Simpson | 385/116 |
| 3,538,321 | 11/1970 | Longenecker et al. | 385/115 |
| 3,741,839 | 6/1973 | Komiya | 385/115 |
| 3,830,667 | 8/1974 | Carpenter | 385/115 |
| 4,487,646 | 12/1984 | Murray et al. | 385/115 |
| 4,737,215 | 4/1988 | Stoffels et al. | 385/115 |
| 4,743,089 | 5/1988 | Sakakibara et al. | 385/115 |
| 5,009,475 | 4/1991 | Knudson | 385/133 |
| 5,022,043 | 6/1991 | Jacobs | 385/121 |
| 5,046,816 | 9/1991 | Lehmann et al. | 385/115 |

FOREIGN PATENT DOCUMENTS 63-92904 4/1988 Japan .................................. 385/121

*Primary Examiner*—John D. Lee
*Assistant Examiner*—John Ngo
*Attorney, Agent, or Firm*—Edward S. Roman

[57] ABSTRACT

In one embodiment, a process for manufacturing an optical fiber coupler of the invention utilizes a rotating drum that has a sloted portion or stacking slot for receiving multiple lengths of fiber in a stack. A support for the input ends of the fibers is in the form of a block which is secured to the surface of the drum in spaced relation with the slot. The block has a plurality of shallow, parallel spaced apart grooves in parallel alignment with the stacking slot. An end of the fiber is initially threaded preferably into the stacking slot and then sequentially located alternately in vacant grooves in the support. As the drum is rotated, a positioner operates to move the fiber transversely in the direction parallel to the drum axis so as to align the fiber in each respective one of the grooves and the slot for each rotation of the drum. The process continues until all the grooves are all occupied and the stacking slot is filled with a corresponding number of fiber lengths. The stacked output ends of the fibers are secured together by an appropriate adhesive and the input ends of the fibers are likewise secured in the grooves of the block by an appropriate adhesive. The fibers are severed at the input and output ends to allow for removal of one or more devices from the drum. The invention also includes the apparatus for performing the process and the resulting optical fiber coupler.

24 Claims, 4 Drawing Sheets

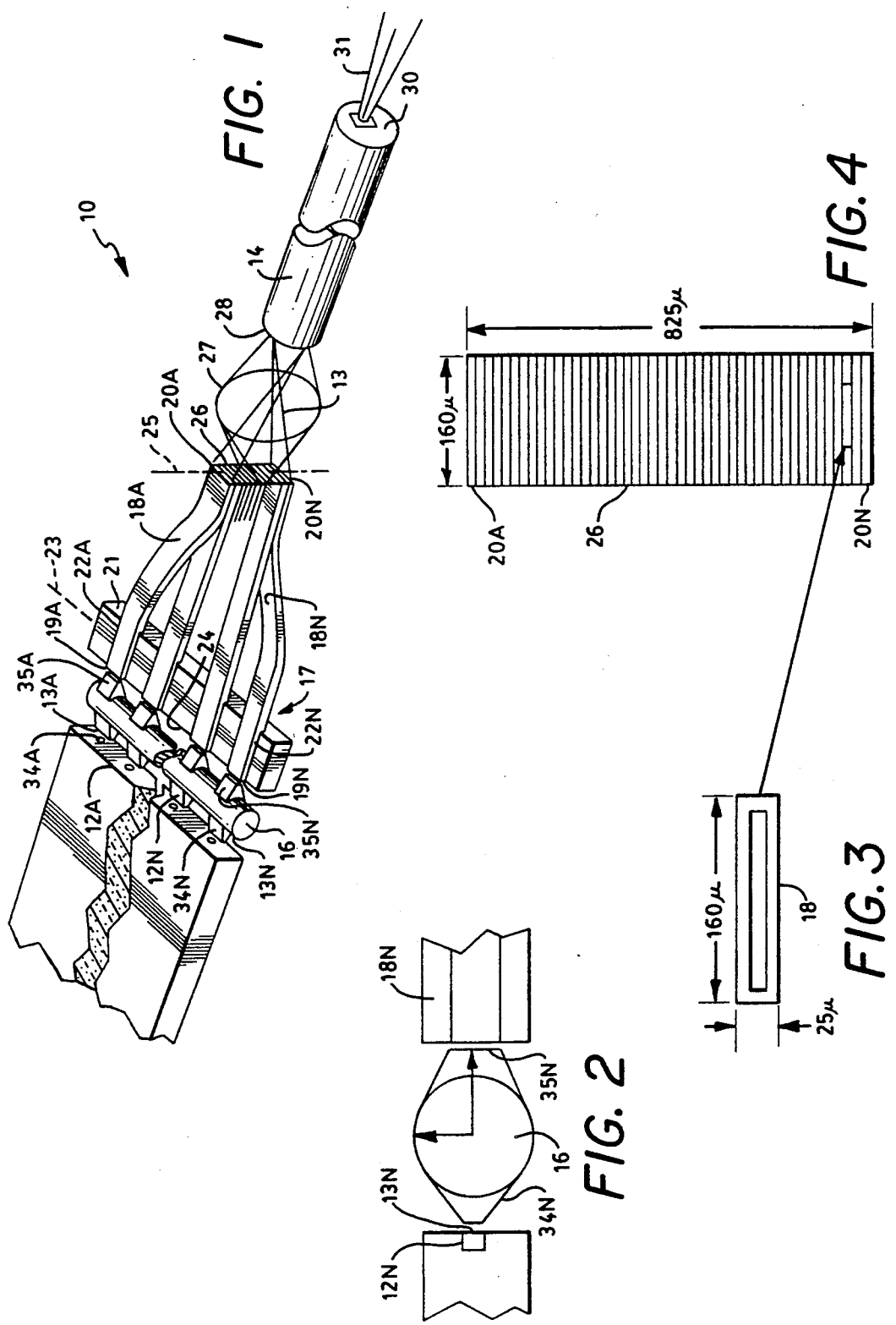

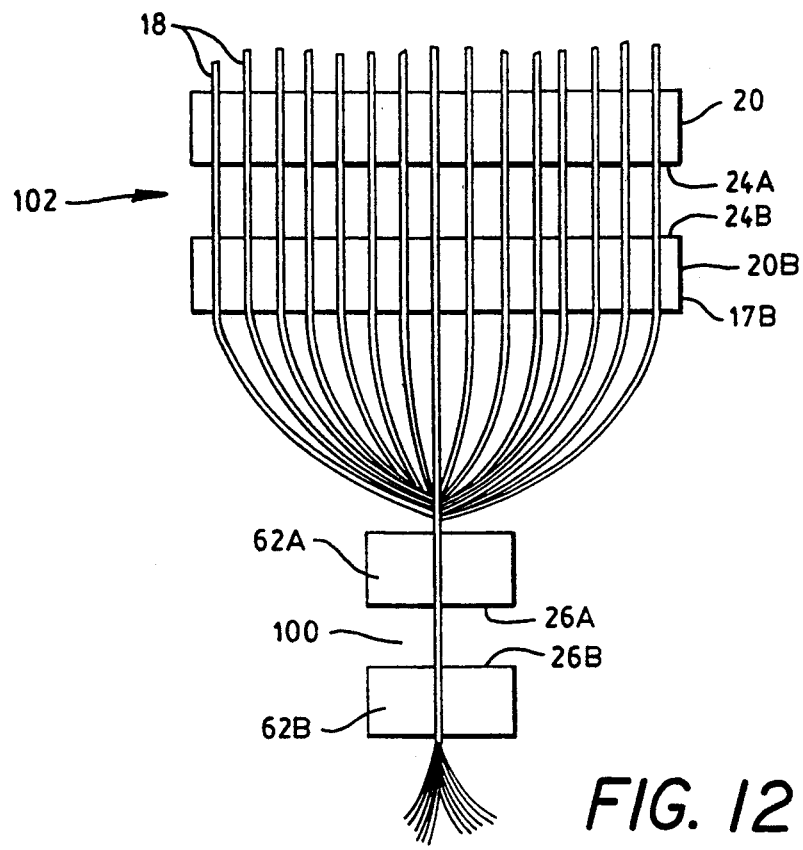
FIG. 12
FIG. 15
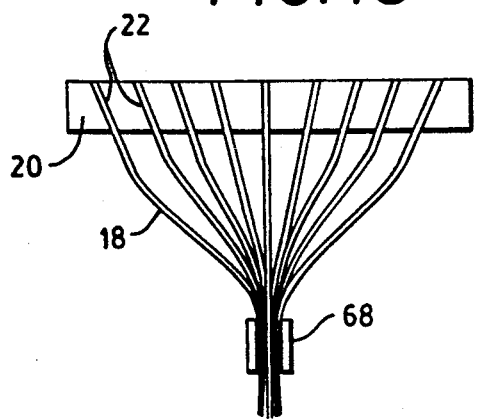
FIG. 16
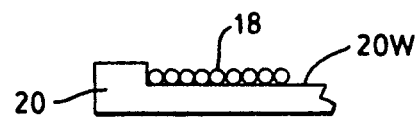

METHOD AND APPARATUS FOR MAKING A FIBER OPTICAL COUPLER

BACKGROUND OF THE INVENTION

1. Field of the Invention

The invention relates to a fiber optic coupler and the method and apparatus for making the same. In particular, the invention relates to a fiber optic coupler for converting a plurality of spaced apart, input laser sources to a clustered concentrated output. In the method of manufacture, a fiber input end support having a plurality of slots is carried on a winder in circumferentially spaced relationship with a fiber stacking slot. A fiber is automatically located in each of the slots and the fibers are combined in the stacking slot as the winder is rotated.

2. Prior Art

It is known to employ a plurality of relatively low power semiconductor lasers, arranged in side-by-side relation, to pump a relatively high gain medium. In a particular arrangement, disclosed in Jacobs, U.S. Pat. No. 5,022,043, tapered fibers carry a plurality of laser diode inputs to a common output for pumping the gain medium.

In order to achieve the desired results, it is necessary to accurately position the respective fiber ends. This may be achieved by securing the individual fiber ends, one at a time, with respect to each of the laser sources and gathering the output ends of the fibers together into a cluster. The method requires individual manufacture of each device by hand and is thus expensive and time consuming.

There are systems for arranging round optical fibers in bundles. For example, U.S. Pat. No. 3,125,812 (Simpson) employs a reel to wind a fiber into one or more adjacent rows of multifibers. U.S. Pat. No. 4,737,215 (Stoffels et al.) employs a frame with alignment pins for winding a fiber into an array of parallel elements in order to produce a ribbon of fibers. However, conventional fiber geometry does not readily lend itself to close packing whereby energy transfer efficiency is enhanced.

SUMMARY OF THE INVENTION

The present invention seeks to obviate and eliminate the disadvantages and limitations of the described prior arrangements and methods of manufacture. In an embodiment of the invention contemplated herein, the input ends of rectangular fibers are located in a micromachined support having spaced apart parallel grooves.

The method of the invention utilizes a rotating drum having a slotted portion in the form of a deep groove or stacking slot which extends partially around the circumference of the drum. The stacking slot may be formed in a separable block secured on the drum. The stacking slot is deep enough to receive multiple lengths of fiber in a stack or cluster, one fiber wide, extending in the radial direction of the drum. The support for the input ends of the fibers is in the form of a block which is secured to the surface of the drum in circumferentially spaced relation with the slot. In one embodiment the block has a plurality of parallel spaced apart, shallow grooves or fiber input slots. Each shallow groove may be parallel with the stacking slot in the drum. A fanned arrangement of grooves, converging towards the stacking slot, may be employed to facilitate assembly. A leading edge of the fiber is initially threaded preferably into the stacking groove and then sequentially and alternately through unoccupied respective shallow grooves in the support block. As the drum is rotated, a positioner operates to move the fiber tranversely in the direction parallel to the drum axis so as to align the fiber in each respective one of the shallow grooves for each rotation of the drum. As the drum rotates further, the optical fiber winds upon itself in the stacking groove creating a stacked bundle as well. The process continues until the shallow grooves are all occupied and the stacking groove is filled with a corresponding number of fiber lengths. The output ends of the fibers are secured together by an appropriate adhesive and the input ends of the fibers are likewise secured in the shallow grooves of the block by an appropriate adhesive or some other fastening means. The fibers are severed at the input and output ends to allow for removal of one or more devices from the drum. In other embodiments, the block may have one wide groove or a pegged stop for receiving the fiber ends in closely packed, intimate side-by-side contact.

In a particular embodiment, there is provided the method for stacking and laterally positioning corresponding portions of lengths of rectangular optical fibers in an array in which a first end of each fiber is stacked and closely packed in a first direction and a second end of each fiber is located laterally adjacent each other, side-by-side, in a second direction transverse of the first direction. The second ends are secured in a body having shallow adjacent grooves therein for receiving the fiber ends. The method comprises securing the body to the outer surface of a rotatable drum such that the shallow grooves are disposed in a circumferential direction, and locating the fiber in a circumferential groove of the drum transverse of the body. The drum is rotated and the fiber is wound on the drum thereby. As the drum is rotated, the fiber is directed alternately into the circumferential groove and into a selected unoccupied shallow groove for each drum rotation.

The apparatus for performing the invention includes a rotatable drum having an outer surface with a circumferential slot or a separable slotted stacking block and means for securing the support to the drum. Means is provided for locating the fiber in the circumferential slot and in the grooves for each rotation of the drum.

The resulting structure comprises a support block having a plurality of grooves; a plurality of rectangular fibers which have an input end, each one of which is located in a corresponding groove in the block in side-by-side relationship in a first direction. An output end of each fiber is located in closely packed stacked relationship in a direction transverse to the first direction.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 1 is a fragmentary schematic illustration of the overall layout of a fiber laser which is pumped by the concentrated outputs of a plurality of semiconductor lasers feeding a fiber optic coupler of the present invention;

FIG. 2 is a fragmentary side view of a portion of FIG. 1 illustrating optical coupling of the semiconductor outputs to the input of the fiber optic coupler of the present invention;

FIG. 3 is an enlarged end view of a stack of optical fibers from FIG. 1;

FIG. 4 is an enlarged end view of one of the stacked fibers from FIG. 3;

FIG. 12 is a plan view of an alternative embodiment employing opposed supporting blocks and stacking blocks for enhancing the winding efficiency of the fiber optic coupler of the present invention;

FIG. 15 shows an alternate embodiment of a support for a coupler having fibers in intimate side-by-side contact; and FIG. 16 is an alternative of a fanned support.

DESCRIPTION OF THE INVENTION

Figure 5:
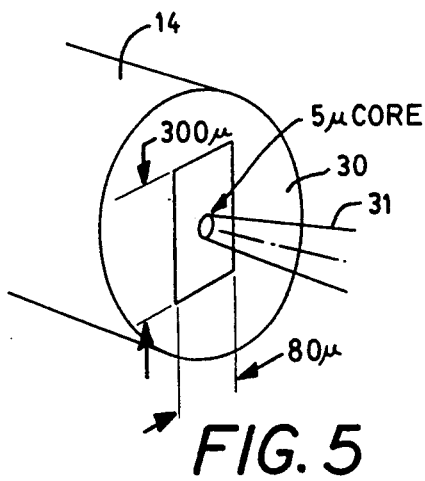
FIG. 5 is a fragmentary perspective end view of the fiber laser illustrated in FIG. 1.
Figure 6:
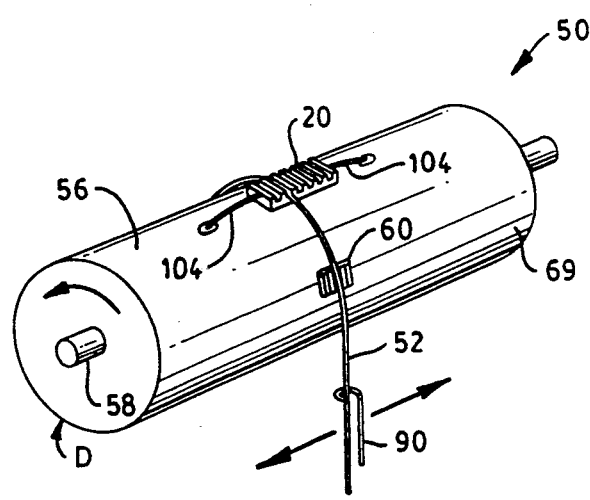
FIG. 6 is a perspective view of an apparatus according to the present invention for assembling the fiber optic coupler illustrated in FIG. 1.
Figure 7:
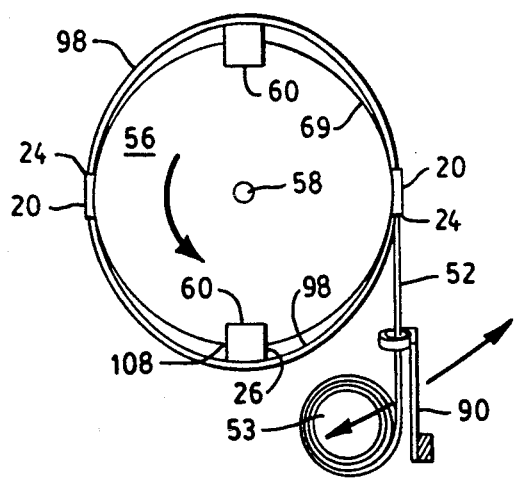
FIG. 7 is an end view of the apparatus illustrated in FIG. 6.
Figure 8:
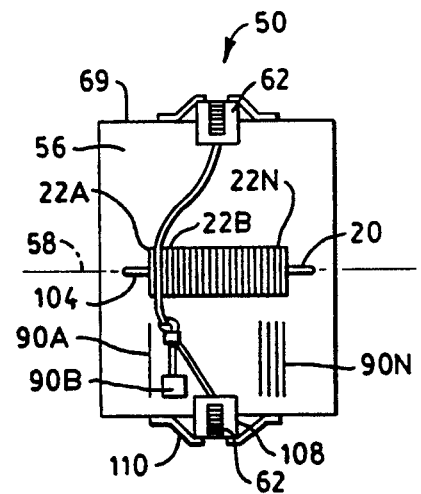
FIG. 8 is a plan view of the apparatus illustrated in FIG. 6.

FIGS. 1-5 generally illustrate a fiber laser system in which a plurality of semiconductor lasers 12A-12N, arranged in side-by-side relation, are used to pump a fiber laser 14. Semiconductor lasers 12A-12N produce corresponding light outputs 13A-13N which are focused by cylindrical lens 16 and input into a fiber optic coupler 17 according to the present invention. The coupler 17 includes a plurality of optical fibers 18A-18N. In a preferred embodiment, each fiber 18A-18N has a rectangular cross-section. The optical fibers 18A-18N each have a respective input end 19A-19N and a corresponding output end 20A-20N. A semiconductor or crystalline support block 21 has a plurality of parallel micromachined grooves 22A-22N which are spaced apart in a first transverse direction 23. The input end 19A-19N of each fiber 18A-18N is located in a corresponding groove 22A-22N of block 21 forming a coupler input 24. The output ends 20A-20N of the fibers 18A-18N are stacked, as shown, in a second direction 25, transverse of the first direction 23, forming a coupler output 26. A lens 27 optically couples the output 26 of the coupler 17 to the fiber laser 14 which has an input end 28 and an output end 30. Light coupled to the laser 14 is reflected between the input end 28 and the output end 30. In a known manner, the laser 14 produces a coherent output beam 31 when a certain energy level in the laser is reached. The crystalline or semiconductor block 21 facilitates accurate spacing and support of the fibers 18. In particular, semiconductor is preferred because machines are readily available for machining semiconductors at reasonable cost to produce straight side walls by various known methods.

The spacing of the grooves 22 controls the pitch of the fibers 18. Alternatively, when the pitch is not a primary concern or when space is at a premium, the block 21 may be provided with a single, wide groove for receiving the fibers in closely packed, intimate side-by-side contact (not shown). Also, if desired the block 21 may simply have a flat upper surface with an end stop or peg (not shown) for closely packing the fibers side by side.

As illustrated in FIGS. 1 and 2, the input lasers 12A-12N each produce corresponding light outputs 13A-13N which are coupled by the lens 16 to the corresponding fibers 18A-18N. In a preferred embodiment, lens 16 has wedge-like lens inputs 34A-34N and lens outputs 35A-35N which are aligned respectively with corresponding lasers 12A-12N and fiber inputs 19A-19N. The lens 16 thereby couples the light 13A-13N to the fibers 18A-18N which is combined as a concentrated light output 13 as the coupler output 26.

For simplifying the discussion, hereinafter, unless it is necessary for identifying a particular fiber, designations A-N will not be used.

In a preferred embodiment, each fiber 18 has a rectangular configuration (FIG. 3.) In an exemplary embodiment, each fiber 18 is about 160 microns wide and about 25 microns high. In accordance with the invention, the rectangular geometry of the fibers 18 allows the coupler 17 to more efficiently, combine and concentrate the relatively low power outputs of the lasers 12. That is, the laser light 13A-13N from each of the individual lasers 12A-12N which lie side-by-side in the first direction 23 are combined geometrically or spatially and clustered in closely spaced adjacent relationship in the second direction 25, as illustrated. This clustering more efficiently concentrates the light output 26 of the coupler 17 thus permitting efficient optical coupling to the fiber laser 14. Alternatively, various fiber geometries may be employed as desired.

Manufacture of the coupler 17 is difficult. In particular, as can be appreciated from the exemplary dimensions shown in FIGS. 1-5, it is difficult to handle the fibers 18. It is especially difficult to fit each of the fiber input ends 19A-19N into the respective grooves 22A-22N of the block 20. It is also difficult to laterally displace the fibers 18 without twisting or overly stressing them so that their outputs 20 conform to the stacked configuration shown in FIG. 4.

Figure 9:
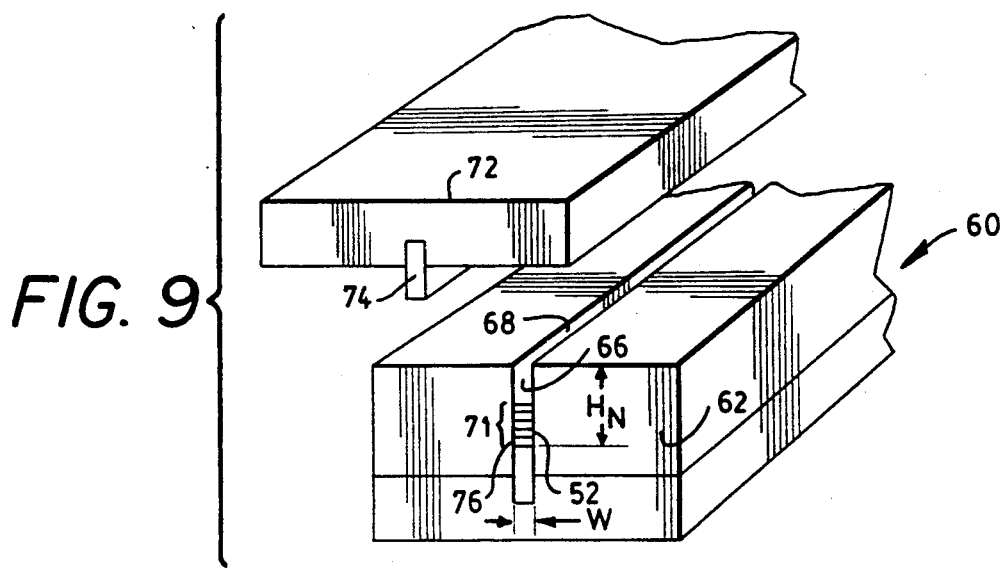
FIG. 9 is an exploded perspective view of a slotted fiber stacking block.

FIGS. 6-10 illustrate an apparatus 50 useful for manufacturing coupler 17. In accordance with the invention, a strand of fiber 52 is supplied from a supply reel 53. An assembly drum 56, mounted for rotation about a central axis 58, has at least one and preferably, a plurality of slotted portions 60 located about the periphery thereof. The slotted 60 portions may be in the form of separable stacking blocks 62, as shown in FIG. 9, each having an open slot 66 formed with open end 68. The stacking block 62 and the fiber support blocks 20 are secured to exterior surface 69 of the drum at alternate circumferentially spaced locations, as illustrated. Block 62 is located so that its open end 68 faces outwardly of the drum surface 69. Likewise, the grooves 22 in block 20 are open in the same direction. In addition, the slot 66 and the grooves 22 lie in planes perpendicular to the central axis 58 of the drum 56.

Figure 10:
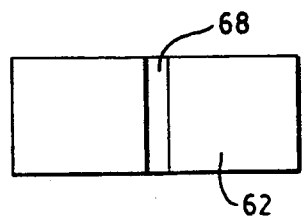
FIG. 10 is a plan view of the slotted stacking block of FIG. 9.

FIG. 9 illustrates in an exploded perspective view one of the stacking blocks 62 with one or more layers of the fiber 54 stacked therein. FIG. 10 illustrates the stacking block 62 in plan view. The slot 66 in stacking block 62 is elongated and has a width W sufficient to receive the fiber strand 52 therein width wise. The slot 66 has a height $H_N$ sufficient to receive at least N fibers 52 in a stack 71 therein as illustrated. When the slot 68 is filled with N layers of the fibers 52, a cap 72 is disposed over the block 62 to close the slot 66. The cap 72 carries an elongated spline 74 which mates with the slot 66 and extends inwardly thereof to engage the stack 71 and to thereby compress it when pressure is exerted on the cap 72.

Figure 11:
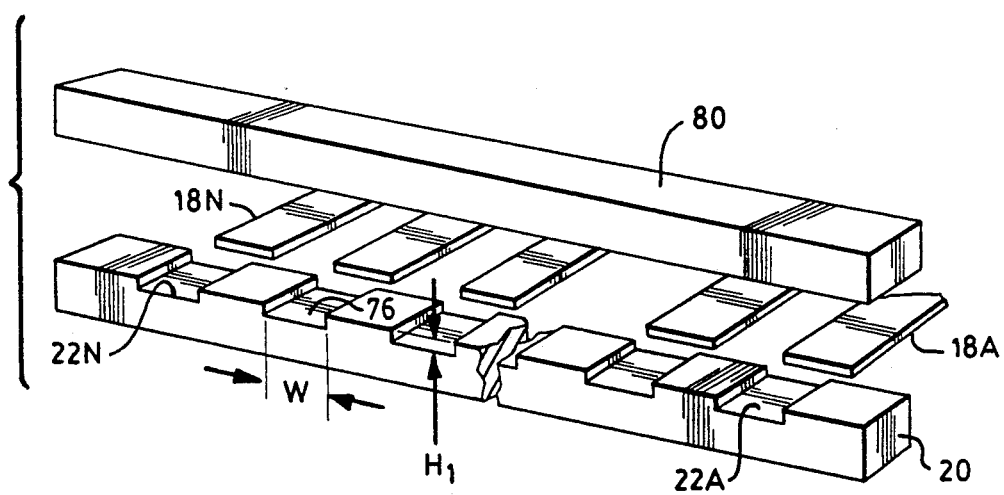
FIG. 11 is a fragmentary exploded perspective view of a support for the fiber input ends of the coupler according to the present invention.

FIG. 11 illustrates, in exploded perspective, an embodiment of the support block 20 with one or more lengths of the fiber 18A-18N located in the grooves 22A-22N. Each groove 22A-22N has a width W similar to that of the slot 66. Normally, the grooves 22 have a height $H_1$ sufficient to accommodate one thickness of one fiber 52 only. If desired a deeper groove maybe provided to accommodate multiple fibers. When individual lengths of the fibers 52 are located in the corresponding grooves 22A-22N, a cap or cover 80 may be secured to the block 20 for maintaining the fibers 52A-52N in position.

An adhesive 76, such as for example, a UV curable material may be employed to secure the fiber stack 71 together. Likewise, when the individual fibers 52A-52N are located in the grooves 22A-22N, adhesive 76 may be employed to secure the fibers 52 in the block 20.

While it is possible to position and thread the continuous fiber strand 52, or a plurality of individual fiber strands, by hand using the apparatus of the invention, it is preferable to use an automated device. In one such device illustrated in FIGS. 6-8, the fiber strand 52 is fed to the drum 56 through a laterally reciprocal and indexable control or robot arm 90. In accordance with the invention, the fiber 52 is initially located in the slot 66 of one of the stacking blocks 62. Thereafter, the drum 56 may be rotated (counter clockwise) to take up the fiber 52. As the drum 56 is rotated, the control arm 90 is indexed to one of a plurality of feed locations 90A-90N (FIG. 8), corresponding to one of the groove locations 22A-22N, whereupon the fiber 52 is located in a corresponding groove (e.g. 22A). As the drum 56 continues to rotate, the control arm 90 is moved to a central or neutral position 94 which corresponds to the location of the slot 66 in the stacking block 62. Likewise, the fiber 52 is drawn into the slot 66 under tension. As the drum 56 continues to rotate, the control arm 90 is indexed to selected locations for a next vacant groove. In the example illustrated, the control arm 90 moves to feed position 90B corresponding to groove 22B. After the drum has been rotated N times so that grooves 22A-22N are occupied and so that there are N fiber lengths in each slot 66 of each stacking block 62, the adhesive 76 may be applied to the fibers in each groove 22 and in each slot 66. Alternatively, the fiber 52 may be coated with a heat sensitive coating which may be heat cured to secure the fibers 52 together.

Upon completion of the winding operation, as noted above, the couplers 17 are formed by severing the fibers 52 at the input end 24 of the block 20 and at the output end 26 of the stacking block 62. In the arrangement illustrated in FIG. 7, two couplers 17A and 17B are formed in this manner. The severed ends 24 and 26 may be polished to achieve optically flat surfaces. Material 98 intermediate the couplers 17A and 17B may be discarded.

In an alternative embodiment (FIG. 12), a pair of stacking blocks 62A-62B may be located on the drum 56 in confronting spaced relation with an axial space 100 therebetween (FIG. 12) whereby a pair of output ends 26A-26B may be formed by cleaving the stack 26 in the space 100 between stacking blocks 62A-62B, as illustrated.

Likewise, as illustrated in FIG. 12, a pair of support blocks 20A-20B may be located in spaced relationship separated by space 102. The fibers 18 may be cleaved in the space 102 therebetween for forming a pair of input ends 24A-24B. Utilizing such an arrangement, couplers may be formed continuously about the drum 56 without wasting or discarding the intermediate fiber portions 98 mentioned above.

In the various embodiments illustrated the grooves 22 are parallel. However, grooves 22F may be formed in a fanned arrangement (FIG. 16) to facilitate assembly and reduce bending between the grooves 22F and the stacking slot 68.

Referring again to FIGS. 6 and 8, the support blocks 20 may be secured to the outer surface 69 of the drum 56 by means of clips 104 (FIG. 12). In a preferred embodiment, the support blocks 20 are secured to the drum by a releasable adhesive on the drum surface 69 at the block locations.

Likewise, in the arrangement illustrated, the stacking blocks 62 may be secured in axial slots 108 in the drum surface by clips 110. If desired, the stacking blocks 62 may be secured to the drum 56 by means of releasable adhesive. Alternately, a stacking groove (not shown) may be formed directly in the surface 69 of the drum 56.

Figure 13:
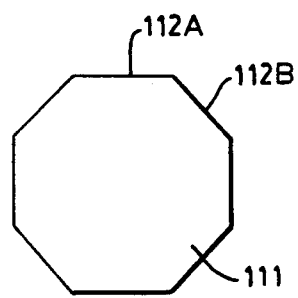
FIG. 13 is a side view of an alternative embodiment of the invention employing a drum with flattened sides.

It should be understood that the diameter D of the drum 56 should be of a size sufficient to result in a minimal curvature in the coupler 17 as it is formed on the outside surface 57. In the preferred embodiment of the invention, each coupler 17 may be about 1.5 inches from the input to the output. Accordingly, it is preferred that the diameter D of the drum be approximately 6 to 12 inches in order to prevent bending losses in the coupler 17. Alternately, as shown in FIG. 13, it is possible to provide a multisided drum (111) having a plurality of flattened surface portions 112A-112K whereupon K couplers (not shown) may be formed.

Figure 14:
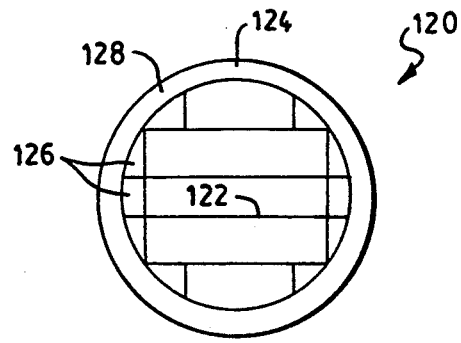
FIG. 14 is an end section view of a perform for a rectangular fiber.

As illustrated in the end sectional view of FIG. 14, the rectangular fiber 52 is drawn from a fused preform 120 formed of a square or rectangular core 122, and a cladding 124 assembled from shaped filler pieces 126 surrounded by a cylindrical sleeve 128. The assembled preform 120 is fused and redrawn into rectangular fiber strand 52 having an aspect ratio remarkably similar to that shown in FIG. 14 but of much reduced size.

While there have been described what at present are considered to be the preferred embodiments of the present invention, it will be readily apparent to those skilled in the art that various changes may be made therein without departing from the invention, and it is intended in the claims to cover such changes and modifications as fall within the true spirit and scope of the invention.

What is claimed:

1. A method for stacking and laterally positioning corresponding portions of lengths of optical fibers in an array in which a first end of each fiber is stacked in a first direction in a circumferential slot of a drum and a second end of each fiber is located laterally adjacent each other in a second direction transverse of the first direction, said second end being secured in a body having adjacent grooves therein for receiving a corresponding fiber end comprising the steps of:

securing the body on an outer surface of the drum;
securing a portion of the fiber in at least one of the grooves and a circumferential slot;
rotating the drum and winding the fiber on the drum thereby;
alternately locating the fiber into a portion of the circumferential slot for portions of each revolution and thereby forming a stack of fibers therein, and locating the fiber to one of the grooves in the body for each revolution of the drum;
securing the fibers in the slot together, and securing the fibers in the grooves to the body; and
severing the secured together stack of fibers for forming one end of the array, and severing the fibers at a distal end of the body for forming a second end of the array.

2. The method of claim 1, wherein the body has N grooves therein for receiving one length of fiber in each groove and the slot is one fiber width wide and is sufficiently deep for receiving N lengths of fiber stacked therein and the drum is rotated a sufficient number of times for N fibers to be stacked in the slot and N grooves to be occupied by a length of fiber.

3. The method of claim 1, wherein the grooves are fanned relative to the slot.

4. A method for manufacturing a fiber optic coupler formed of a plurality of fibers stacked in an adjacent array in a first direction in a circumferential slot of a drum at one end of the coupler and secured in spaced apart relation side-by-side in a second direction at an opposite end of the coupler in a grooved support comprising the steps of:

supplying a length of fiber to the slot in the drum;
removably securing the support to the drum with the grooves in said support being in alignment with the circumferential slot of the drum;
alternately supplying the fiber to the slot and to each successive groove in the support while rotating the drum a sufficient number of revolutions to supply each groove with a fiber and for stacking a corresponding number of fibers in the slot;
securing the fibers in the slot together, and securing the fibers in the grooves to the support; and
severing the fibers in the stack and at the support for forming the coupler.

5. The method of claim 4, wherein the drum is provided with at least one slot for each support, and the slot and support are at alternate circumferential positions about the drum and positioning the fiber comprises the step of indexably locating the fiber in a slot and in a vacant groove in the support for each revolution of the drum.

6. The method of claim 4, wherein the drum has a plurality of slots for stacking the fibers at spaced circumferential locations about the drum and a plurality of said supports are located about the drum at locations intermediate the slots and the step of locating the fiber comprises feeding the fiber into each slot followed by feeding the fiber into a vacant groove in a support alternately as the drum is rotated until each groove is occupied by a fiber and each slot has a stack of fibers at least equal in number to the number of grooves in the support.

7. The method of claim 6, further comprising the step of compressing the fibers in each stack by applying a radial force on the stack of fibers within the slot for closely packing the stacked fibers.

8. The method of claim 7, further comprising the step of securing the stacked fibers together in a clustered bundle.

9. The method of claim 6, further comprising the step of securing the fibers in the support including applying a force against the fibers in a direction transverse to the side-by-side arrangement of fibers.

10. The method of claim 6, further comprising the steps of severing the fibers at an end of the support remote from the stacked fibers and severing the stacked fibers thereby forming a coupler having a plurality of side-by-side fiber ends at one end secured in the support at one direction and a corresponding plurality of stacked fiber ends secured together remotely from the support.

11. The method of claim 6, wherein the fiber has a rectangular cross-section and the method further comprises the steps of forming said grooves in the support with rectangular cross-section for receiving the fibers therein in side-by-side relationship and forming the slot in the drum with a rectangular cross-section having a width at least as wide as the fiber and a depth sufficient to receive a number of fibers in a stack corresponding to the number of grooves in the support.

12. The method of claim 4, further comprising polishing ends of the severed fibers.

13. The method of claim 4, wherein the slot and the grooves are in parallel axial alignment.

14. Apparatus for manufacturing a fiber optic coupler formed of a plurality of optical fibers joined at one end in a stack and secured at an opposite end to a grooved support in side-by-side relationship in a direction transverse to the stacking direction comprising:

a rotatable drum having an exterior surface for receiving the support thereon with the grooves aligned in parallel circumferential relationship with respect to the drum, said drum having a slotted portion formed therein being circumferentially spaced from the support; and
means for supplying the fiber alternately between the slotted portion and successive vacant grooves of the support.

15. The apparatus according to claim 14, wherein the means for supplying the fiber comprises a control arm for supplying each vacant groove for each rotation of the drum.

16. The apparatus according to claim 14, wherein the slotted portion comprises a slotted stacking block secured in the drum.

17. The apparatus according to claim 16, further including means for securing the stacking block and the support to the drum.

18. The apparatus according to claim 17, wherein the means for securing the stacking block and support to the drum comprises a pair of resilient clips.

19. The apparatus according to claim 18, wherein the means for securing the stacking block and support to the drum comprises a releasable adhesive.

20. The apparatus according to claim 14, wherein the means for supplying the fiber to the slot and grooves comprises an arm indexable between successive grooves and slots.

21. The apparatus according to claim 14, wherein the drum has an outer surface comprising a plurality of interconnected flat surface portions, and at least one each of said supports and slotted portions is located at opposite ends of each flat surface portion.

22. A method for stacking and laterally positioning corresponding portions of lengths of optical fibers in an array in which a first end of each fiber is stacked in a first direction in a circumferential slot of a drum and a second end of each fiber is located laterally adjacent each other in a second direction transverse of the first direction, said second end being secured in a body having means for receiving corresponding fiber ends side by side comprising the steps of:

- securing the body on an outer surface of the drum;
- securing a portion of the fiber in the receiving means of the support and the circumferential slot of the drum;
- rotating the drum and winding the fiber on the drum thereby;
- alternately locating the fiber into a portion of the circumferential slot for portions of each revolution and thereby forming a stack of fibers therein, and locating the fiber in the receiving means for each revolution of the drum;
- securing the fibers in the slot together, and securing the fibers in the receiving means to the body; and
- severing the secured together stack of fibers for forming one end of the array, and severing the fibers at a distal end of the body for forming a second end of the array.

23. A method for manufacturing a fiber optic coupler formed of a plurality of fibers stacked in an adjacent array in a first direction at one end of the coupler and secured in side-by-side in a second direction at an opposite end of the coupler in a support comprising the steps of:

- supplying a length of fiber to a drum having a circumferential slot;
- removably securing the support to the drum alignment with the slot;
- alternately supplying the fiber to the slot and to the support while rotating the drum a selected number of revolutions for stacking a corresponding number of fibers in the slot in the first direction and to the support in the second direction;
- securing the fibers in the slot together, and securing the fibers to the support; and
- severing the fibers in the stack and at the support for forming the coupler.

24. Apparatus for manufacturing a fiber optic coupler formed of a plurality of optical fibers joined at one end in a stack and secured at an opposite end to a support in side-by-side relationship in a direction transverse to the stacking direction comprising:

- a rotatable drum having an exterior surface for receiving the support thereon, said drum having a slotted portion formed therein being circumferentially spaced from the support; and
- means for supplying the fiber alternately between the slotted portion and the support.

* * * * *